US008376279B2

(12) United States Patent
Parks et al.

(10) Patent No.: US 8,376,279 B2
(45) Date of Patent: Feb. 19, 2013

(54) INFLATABLE FOLDING WINGS FOR A VERY HIGH ALTITUDE AIRCRAFT

(75) Inventors: Robert Parks, San Jose, CA (US); Adam Woodworth, Melrose, MA (US); Peter Lively, Boston, MA (US); Tomas Vaneck, Gloucester, MA (US); Kimberly Kohlhepp, Somerville, MA (US); Justin McClellan, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 936 days.

(21) Appl. No.: 12/358,036

(22) Filed: Jan. 22, 2009

(65) Prior Publication Data

US 2009/0206196 A1  Aug. 20, 2009

Related U.S. Application Data

(60) Provisional application No. 61/023,075, filed on Jan. 23, 2008.

(51) Int. Cl.
 *B64C 3/56* (2006.01)
(52) U.S. Cl. ..................... 244/123.11; 244/49
(58) Field of Classification Search ............... 244/49, 244/123.11, 146, 218, 219, 5
See application file for complete search history.

(56) References Cited

U.S. PATENT DOCUMENTS

| 2,602,614 | A | * | 7/1952 | Cole | 244/123.9 |
| 4,708,078 | A | * | 11/1987 | Legaignoux et al. | 114/102.23 |
| 5,244,169 | A | * | 9/1993 | Brown et al. | 244/146 |
| 7,140,576 | B2 | * | 11/2006 | Logosz | 244/146 |

* cited by examiner

*Primary Examiner* — Tien Dinh
*Assistant Examiner* — Michael Kreiner
(74) *Attorney, Agent, or Firm* — Katten Muchin Rosenman LLP

(57) ABSTRACT

A foldable wing for use with a very high altitude aircraft capable of operating at an altitude at or above 85,000 feet is disclosed. The foldable wing may employ a spiral fold deployment, wherein a hinge between each segment of the foldable wing is slightly offset from the perpendicular. Successively positioned wing segments fold over one another. Alternatively, the hinges are substantially perpendicular so that each respective wing segment folds linearly against the next wing segment. An inflatable rib, with inflatable arms, can be inflated to provide a force against two adjacent arms, thereby deploying the wing segments through a full 180° of rotation.

8 Claims, 23 Drawing Sheets

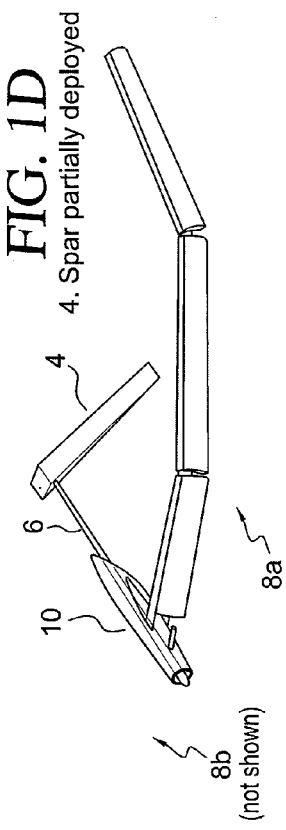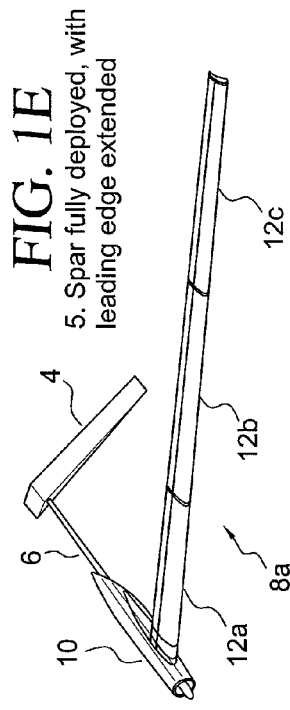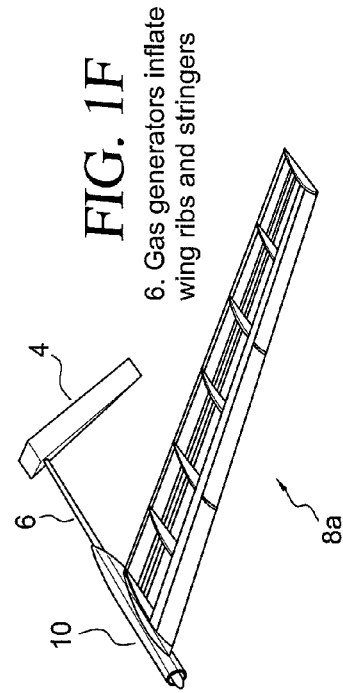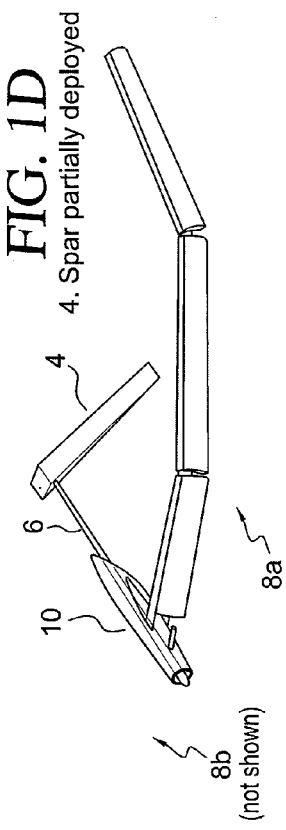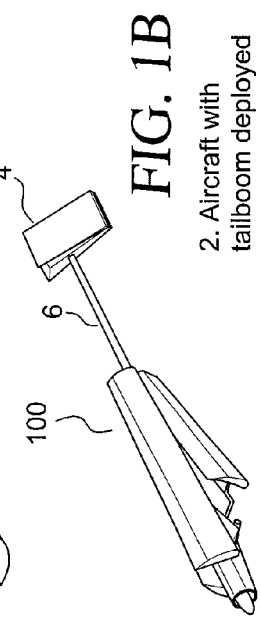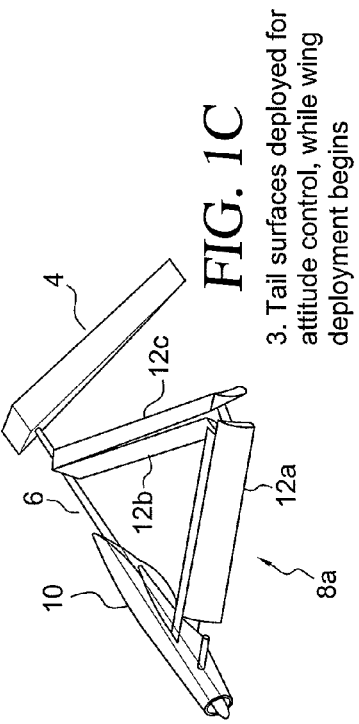

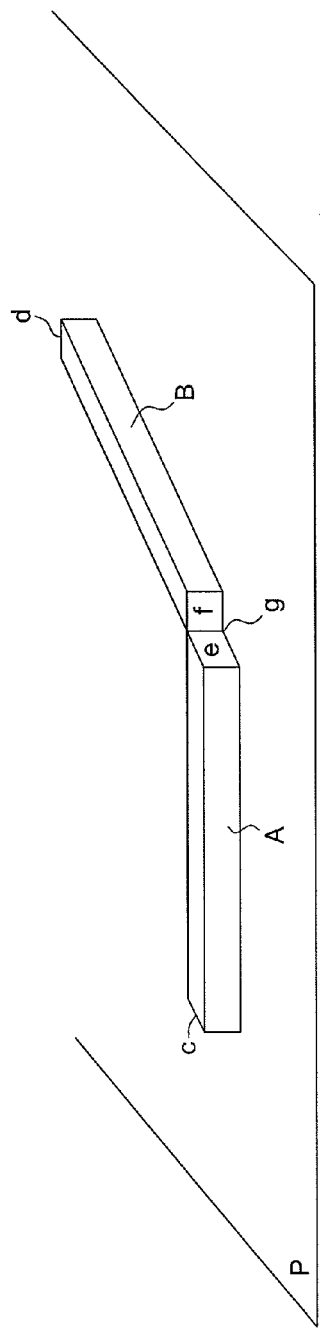
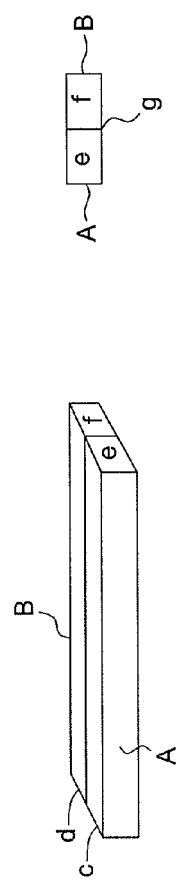
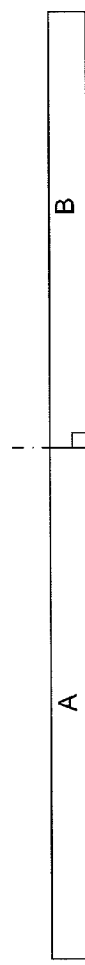
FIG. 14A
FIG. 14B
FIG. 14C
FIG. 14D

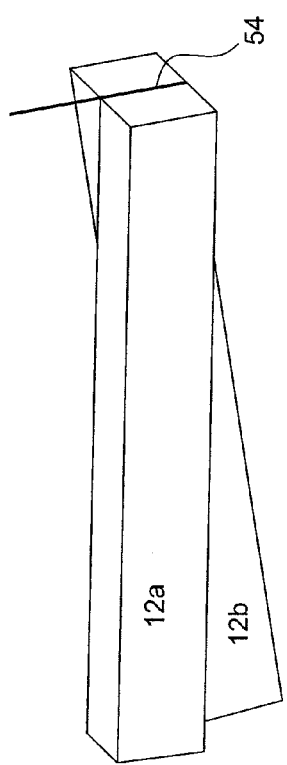

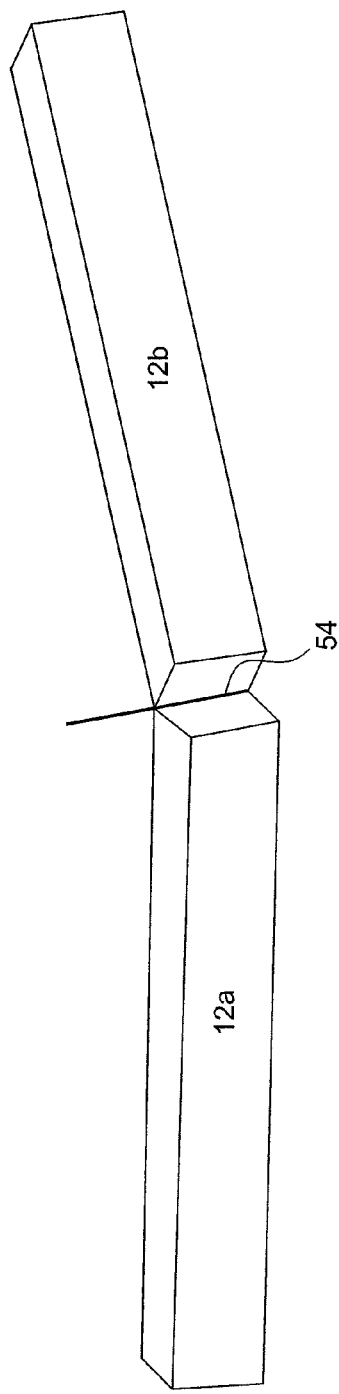

INFLATABLE FOLDING WINGS FOR A VERY HIGH ALTITUDE AIRCRAFT

BACKGROUND OF THE INVENTION

1. Field of the Invention

The invention relates to a wing structure for aircraft. More particularly, the invention relates to an apparatus, and method for its use, of a folding wing structure for a very high altitude aircraft. This particular invention combines both inflatable and rigid hinged elements.

2. Background Art

For aircraft that operate at very high altitudes, the wing structure is a very important criterion. Very high altitudes means altitudes between about 85,000 feet and about 150,000 feet above sea level (ASL). At these altitudes, air densities are very low, and therefore generally, wing structures need to be relatively large areas compared to a similarly sized aircraft operating at lower altitudes of, for example, about 35,000 to 45,000 feet ASL, in order to generate the lift necessary to functionally fly.

Furthermore, if an aircraft is developed to operate at such altitudes, it is desirable to allot as much weight as possible to payload (e.g., sensors, and things of that nature), and to minimize unnecessary weight expenditures wherever possible. As a result, the use of composite materials has recently increased. If the wings could be made of composite and/or inflatable materials, yet still provide the wing area and lift necessary to properly operate at the desired high altitudes, an enormous operating benefit can be obtained.

Because of recent historical developments, a need has been developed to place unmanned aerial vehicles to locations literally around the ground within several hours notice. One manner of deployment can be via rockets, launched from ground locations and/or ocean-going ships. In these cases, the aircraft would have to be foldable and be able to quickly begin operating at high altitudes upon deployment from the rocket.

Thus, a need exists to develop a foldable aircraft, with foldable inflatable wings that can operate at very high altitudes.

SUMMARY OF THE INVENTION

It is therefore a general aspect of the invention to provide a very high altitude foldable inflatable aircraft that will obviate or minimize problems of the type previously described.

According to a first aspect of the present invention, a foldable aircraft is provided comprising an inflatable rib for use in a wing of a very high altitude aircraft capable of operating at an altitude at or above 85,000 feet, the inflatable rib comprising: a plurality of tubes including an innermost tube; a plurality of outer connecting surfaces, wherein the outer connecting surface connects one of the plurality of tunes to an adjacent one of the plurality of tubes; an innermost connecting surface that connects an inner perimeter of the innermost tune to itself; and a linking tube that is connected to each of the plurality of tubes, and is configured to receive gas and to distribute the received gas to the plurality of tubes, thereby inflating each of the tubes to form the inflatable rib.

The gas may comprise a high pressure gas having a pressure at or above 10 pounds per square inch (psi). The gas may be generated by a pressure tank, a chemical reaction gas generator, or a propulsion system associated with the very high altitude aircraft. Each of the plurality tubes may be substantially cylindrical.

According to a second aspect, an inflatable rib for use in a wing of a very high altitude aircraft capable of operating at an altitude at or above 85,000 feet, is provided, the inflatable rib comprising: a single inflatable structure substantially configured to function as a wing rib, and configured to receive a high pressure gas generated by an external gas generating source, wherein the high pressure gas has a pressure at or above 10 psi. The external gas generating source may comprise a pressure tank, a chemical reaction gas generator, or a propulsion system associated with the very high altitude aircraft.

According to a third aspect, a wing segment is provided comprising at least two inflatable ribs, wherein a wing flexible skin between the ribs is supported by and maintained in a predetermined airfoil shape by a series of stringers and a trailing edge. At least one of the stringers and/or the trailing edge may comprise an inflatable tube. Alternatively, at least one of the stringers and/or the trailing edge may comprise a rigid shape made from a metal an/or one or more composite materials. Each of the stringers may comprise one or more rigid materials on an exterior of the wing segment and an inflatable tube inside the wing segment, wherein the inflatable tube is configured to provide stiffness with a predetermined stowed volume and to provide a predetermined wing segment shape.

According to a fourth aspect, a foldable wing structure for use in a very high altitude aircraft capable of operating at an altitude at or above 85,000 feet is provided, the foldable wing structure comprising: a semi-rigid spar, configured to receive and distribute a first gas; at least two or more inflatable ribs, each inflatable rib being connected to the semi-rigid spar; a plurality of inflatable stringers, wherein each of the plurality of inflatable stringers is connected to at least two ribs, and wherein each of the plurality of inflatable stringers is configured to receive and distribute a second gas to the at least two or more inflatable ribs; a plurality of rigid trailing edge tubes, wherein each of the plurality of rigid trailing edge tubes is attached to at least two inflatable ribs; and an inflatable leading edge apparatus configured to receive the first gas from the semi-rigid spar. When the at least two or more inflatable foldable ribs, the plurality of inflatable stringers, and the inflatable leading edge apparatus are in an un-inflated condition, the foldable wing structure is configured to be folded such that a chord of the foldable wing structure has a length of between approximately 25 percent and 50 percent of a length of a maximum respective chord, and when the at least two or more inflatable foldable ribs, the plurality of inflatable stringers, and the inflatable leading edge apparatus are in an inflated condition, the foldable wing structure is configured to be unfolded such that the length of the chord of the foldable wing structure is approximately equal to the length of the maximum respective chord.

The first gas may comprise a low pressure gas having a pressure at or below 0.1 psi. The second gas may comprise a high pressure gas having a pressure at or above 10 psi. The first gas and the second gas may be generated by a pressure tank, a chemical reaction gas generator, or a propulsion system associated with the very high altitude aircraft. The low pressure gas may comprise atmospheric ram pressure from an air scoop on the aircraft.

According to a fifth aspect, a leading edge segment for use in a foldable wing in a very high altitude aircraft capable of operating at an altitude at or above 85,000 feet is provided, wherein the foldable wing includes a spar that receives and distributes a first gas. The leading edge segment comprises: a semi-rigid shell shaped in a form of a leading edge of the foldable wing, the semi rigid shell being hingedly connected to the spar; a flexible membrane connected to a lowermost portion of the semi-rigid shell and to the spar, thereby forming a chamber within the semi-rigid shell and being configured to accept and retain the first gas; and a passageway between the spar and the semi-rigid shell, wherein the passageway is configured to enable a transfer the first gas from the spar to the chamber.

The first gas may comprise a low pressure gas having a pressure at or below 0.1 psi. The first gas may be generated by a pressure tank, a chemical reaction gas generator, or a propulsion system associated with the very high altitude aircraft.

The leading edge may be configured to be deployed as a result of a high pressure gas inflating at least one bladder between the leading edge and the spar, wherein the high pressure gas has a pressure at or above 10 psi.

According to a sixth aspect of the present invention, a foldable wing for use in a very high altitude aircraft capable of operating at an altitude at or above 85,000 feet is provided. The foldable wing comprises: a first spar section, a second spar section, and a third spar section, wherein the first spar section is positioned closest to a fuselage of the very high altitude aircraft, the second spar section is positioned adjacent to the first spar section, and the third spar section is positioned adjacent to the second spar section, and farthest away from the fuselage; a first hinge and a second hinge, wherein the first hinge rotationally connects the first spar section to the second spar section at a first angle, and wherein the second hinge rotationally connects the second spar section to the third spar section at the first angle, and further wherein the third spar section is configured to rotate about 180° such that an outermost portion of the third spar section is located above an innermost portion of the second spar section, and further wherein the second spar section is configured to rotate about 180° such that an outermost portion of the second spar section is located above an innermost portion of the first spar section, and the outermost portion of the third spar section is located above an outermost portion of the first spar section.

The foldable wing according to the sixth aspect may further comprise at least a fourth spar section and a third hinge, the fourth spar section being configured to rotate about 180° such that an outermost portion of the fourth spar section is located above an innermost portion of the third spar section. The first angle may have a measure of between about 1° and about 4°.

According to a seventh aspect of the present invention, a foldable wing for use in a very high altitude aircraft capable of operating at an altitude at or above 85,000 feet is provided, the foldable wing comprising: a first, second and third spar section, wherein the first spar section is closest to a fuselage of the very high altitude aircraft, the second spar section is adjacent to the first spar section, and the third spar section is adjacent to the second spar section, and farthest away from the fuselage; a first hinge and a second hinge, wherein the second hinge is connected to the second spar section and third spar section at a first angle, and wherein the second hinge is configured to rotate the third spar section about the second spar section at the first angle such that a farthest-most portion of the third spar section is located above an innermost portion of the second spar section, and further wherein the first hinge is connected to the first spar section and the second spar section at the first angle, and wherein the first hinge is configured to rotate the second spar section about the first spar section at the first angle such that a farthest-most portion of the second spar section is located above an innermost portion of the first spar.

According to the seventh aspect, the first angle is between about 1° and about 4°, and wherein additional spar sections and hinges can be added such that each can rotate and fold over an inner adjacent spar section.

According to an eighth aspect of the present invention, a foldable wing for use in a very high altitude aircraft capable of operating at an altitude at or above 85,000 feet is provided. The foldable wing comprises: a plurality of hinges; a plurality of spar sections, wherein each of the plurality of spar sections is configured to receive and transfer a first gas, and wherein each of the plurality of hinges rotationally connects a respective spar section to an adjacent spar section; and a plurality of inflatable ribs, wherein each of the inflatable ribs includes a rib section, a first arm, and a second arm, and wherein the first arm is positioned adjacent to a respective spar section, and the second arm is positioned adjacent to an adjacent spar section, and wherein the first arm is configured to inflate when the first arm receives the first gas, and the second arm is configured to inflate when the second arm receives the first gas. Upon inflation, the first arm and second arm are further configured to cause the respective spar section and the adjacent spar section to rotate with respect to one another until the respective spar section and the adjacent spar section couple with one another. The rib is configured to inflate until the rib has a substantially perpendicular orientation with respect to the coupled spar sections.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIGS. 1A-1F illustrate a very high altitude aircraft with foldable wings according to an embodiment of the present invention.

FIGS. 14A-14D illustrate several views of a foldable wing structure wherein foldable wing segments are connected by hinges that are not canted at a first angle.

FIGS. 15A-15G illustrate several views of the foldable wing structure shown in FIGS. 9-13 according to an embodiment of the present invention.

DETAILED DESCRIPTION OF THE PREFERRED EMBODIMENTS

Figure 2A:
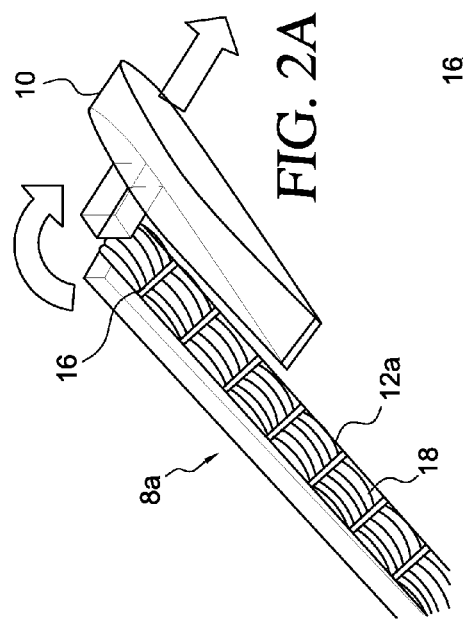
FIGS. 2A-2C illustrate a foldable wing structure as it unfolds according to an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

I. Deployment of Very High Altitude Aircraft

FIGS. 1A-1F illustrate deployment of a very high altitude aircraft (VHA aircraft) 100 according to an embodiment of the present invention. VHA aircraft 100, as shown in FIGS. 1A-1F, can be deployed by various means, including other high altitude operating aircraft (i.e., hypersonic aircraft, rockets and other means. As shown in FIGS. 1A-1F, VHA aircraft 100 is deployed at a very high altitude in a rocket. According to an exemplary embodiment of the present invention, VHA aircraft 100 is stored within fairing 2 of the rocket, at the nose section. Because VHA aircraft 100 is deployed via a rocket, VHA aircraft 100 can be deployed anywhere on the globe within an hour or two from a decision to launch. Such a rapid deployment provides the ability to rapidly acquire pertinent and timely information, in many cases hours, days or weeks before other more conventional information gathering resources, including satellites, can be similarly deployed. According to an embodiment of the present invention, very high altitude comprises altitudes between about 85,000 feet above sea level, and about 150,000 feet above sea level.

Deployment from missiles or rockets, however, is not easy because of the extremely high velocities of the missiles and rockets. Therefore, rocket fairing 2 is designed to include velocity retarding devices to slow itself down enough so that VHA aircraft 100 can be safely deployed. In FIG. 1B, VHA aircraft 100 has separated from rocket fairing 2, and tail boom 6 has begun to extend. In FIG. 1C, foldable tail 4 has unfolded, to allow previously unavailable (up to the present) flight control over VHA aircraft 100 itself. Foldable left wing structure 8a is beginning to deploy as well, with first left wing foldable segment 12a mostly completely deployed away from fuselage section 10, and second and third left wing foldable segments 12b, 12c still nearly completely folded. Wing deployment is accomplished in stages in this manner, i.e., all three left wing foldable segments rotate away from fuselage 10 in stages, so as to keep the moment arm as small as possible. As first left wing foldable segment 12a unfolds, in this case in a clockwise manner (as viewed from above, facing the nose of VHA aircraft 100), second and third left wing foldable segments 12b, 12c rotate together (i.e., deploy) from first left wing foldable segment 12a, again in a clockwise manner. Note that as FIG. ID illustrates, deployment, or unfolding of the wing segments, does not occur mutually exclusively of each other; as first left wing foldable segment 12a is partially unfolded (according to an exemplary embodiment of the present invention, between 60% and 70% unfolded), second and third left wing foldable segments begin unfolding. When second left wing foldable segment is about 60% or 70% unfolded, third left wing foldable segment 12c begins to unfold, and the result is as shown in FIG. 1D. As those of ordinary skill in the art can appreciate, the same actions can be occurring for foldable right wing structure 8b (which is not shown, or described, for purposes of brevity and clarity) at the same time as foldable left wing structure 8a is unfolding, or afterwards, or before.

Figure 2C:
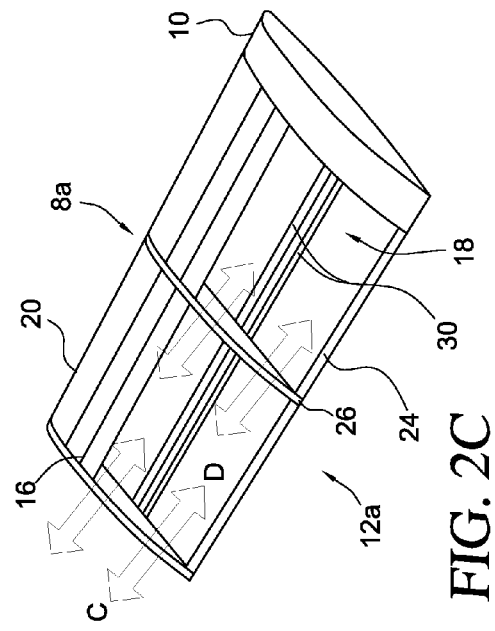
Figure 2B:
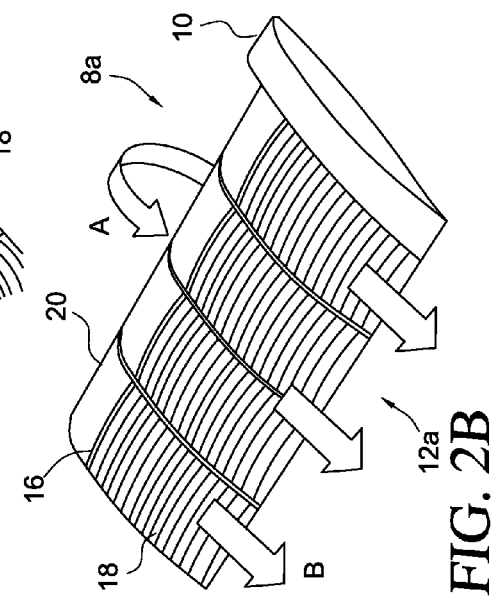

FIG. 1E illustrates left wing foldable structure 8a after all three left wing foldable segments 12a-c have unfolded and locked together. The unfolding of each left wing foldable structure 12a-c and locking together of spars 16 will be described in greater detail below. As those of ordinary skill in the art of the present invention can appreciate, there can be one, two, three or more wing foldable segments 12 for VHA aircraft 100. According to a preferred embodiment of the present invention, the number of left wing foldable segments 12, and right wing foldable segments 14 will be equal, though that need not always be the case. Finally, as shown in FIG. 1F, foldable left wing structure 8a is fully extended and fully inflated. FIGS. 2A-2C illustrate an unfolding of foldable left wing structure 8a from a different perspective than that shown in FIGS. 1A-1F according to an embodiment of the present invention. In FIGS. 2A-2C, foldable left wing structure 8a, and in particular first left wing foldable segment 12a, is shown as it unfolds to an extended state (FIG. 2C). In FIG. 2A, left wing foldable segment 12a is un-extended (i.e., not inflated); in FIG. 2B, left wing foldable segment 12a is extended, but not yet completely inflated. Ribs 26 have been inflated, extending wing covering 18 to the full width of foldable left wing structure 8a, as shown by the direction of arrows B. Foldable left wing structure 8a now takes a more wing-like shape or form, though it is not yet capable of generating lift, because wing covering 18 has not been pulled taut. Leading edge segment 20 folds up, as arrow A indicates. In FIG. 2C, ribs 26 are completely inflated, creating a definite shape to foldable left wing structure 8a; stringers 30 are inflated, and cause foldable left wing structure 8a to expand in the direction of arrows C and D; and trailing edge segments 24 can also be inflated at this time.

According to a preferred embodiment of the present invention, when foldable wing segments 12 have been unfolded and placed together, they can be locked together with clasps. The clasps can be positioned at any of several locations, including, according to an exemplary embodiment, on the spars 16. Still further according to a preferred embodiment of the present invention, gases can travel through spars 16 via internal hoses (not shown), or through spars 16 themselves (following unfolding and locking). Still further, as discussed in greater detail below, when unfolded, pressure from unfolding devices can lock and provide gas tight interfaces between adjacent spars 16.

According to a preferred embodiment of the present invention, when ribs 26, stringers 30, and leading edge segment 20 are in an un-inflated condition, foldable wing structure 12 is configured to be folded such that a width of foldable wing structure 12 is between approximately 25 percent and 50 percent of a maximum chord width.

According to a preferred embodiment of the present invention, when ribs 26, stringers 30, and leading edge segment 20 are in an inflated condition, foldable wing structure 12 is configured to be unfolded such that the width of foldable wing structure 12 is approximately equal to the maximum chord width.

Many of the structures within foldable wing structure 8a are gas inflatable, and each shall now be described in greater detail.

II. Inflatable Ribs with Inflatable or Rigid Stringers and Trailing Edge

Figure 3:
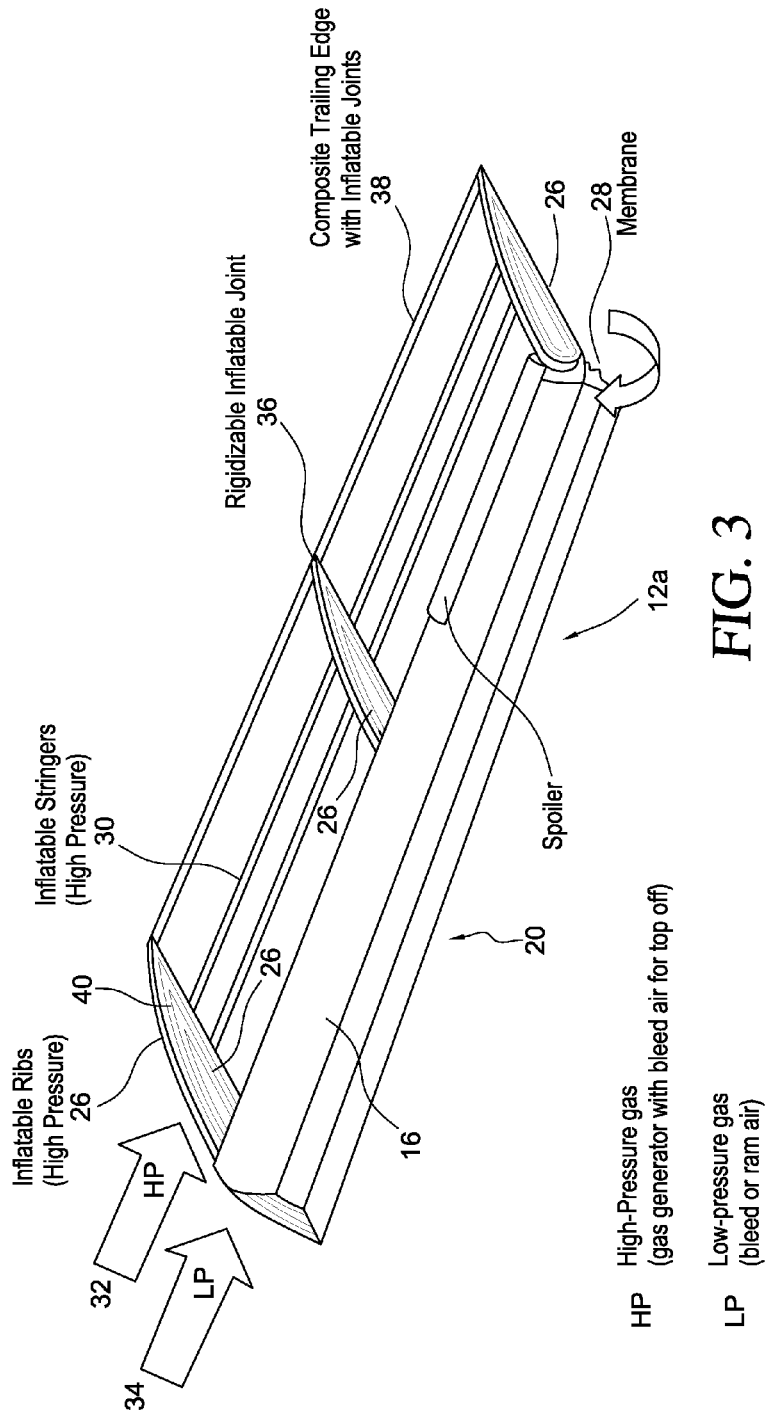
FIG. 3 illustrates a folding wing structure according to an embodiment of the present invention.
Figure 4:
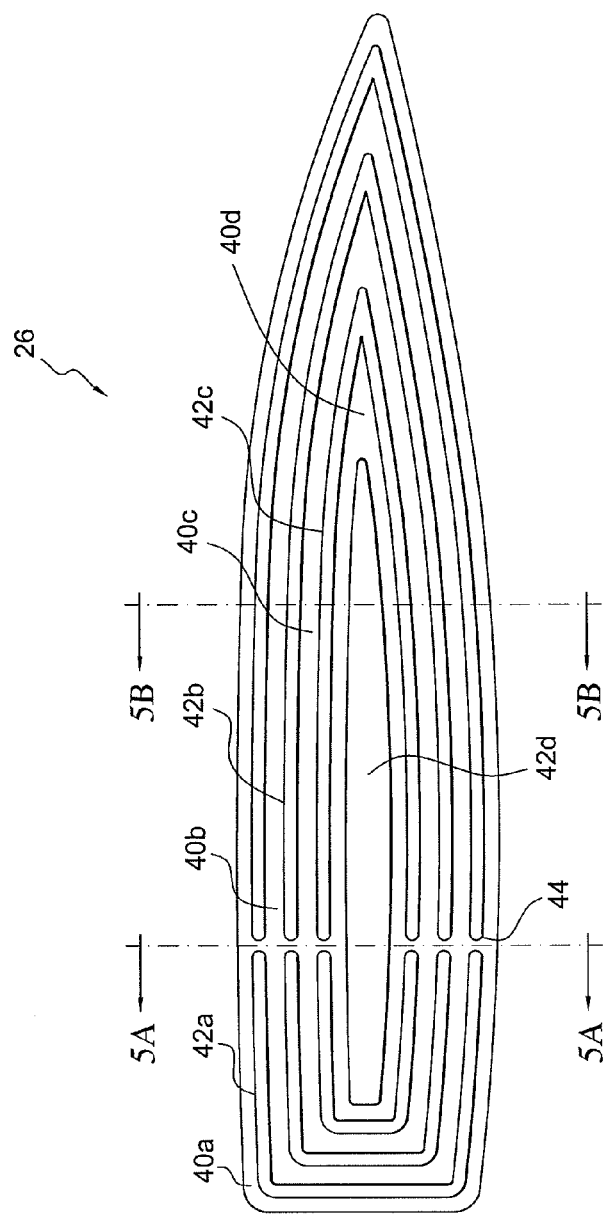
FIG. 4 illustrates a side view of an inflatable rib for use in a foldable wing in a very high altitude aircraft according to an embodiment of the present invention.

FIG. 3 illustrates a front perspective view of left wing foldable segment 12 showing flow of high pressure gas and low pressure gas within at least one inflatable wing structure. According to a preferred embodiment of the present invention, low pressure gases range in value of psi at or below 1 psi, and high pressure gases range in psi values from about 10 psi to about 100 psi. According to a preferred embodiment of the present invention, each left wing foldable segment 12a comprises at least one inflatable rib 26, and preferably at least two: one in the middle of left wing foldable segment 12 and another at the edge that forms the hinge point with an adjacent left wing foldable segment 12. Of course, as those of ordinary skill in the art can appreciate, the number of ribs 26 depends on a variety of factors, and thus the embodiments of the present invention are not to be construed as limited to left wing foldable segment 12 with one, two, or only three ribs 26. As FIGS. 3 and 4 illustrate, each left wing foldable segment 12 comprises folding leading edge 20, spar 16, stringers 30, ribs 26, inflatable joints 36, and composite trailing edge with inflatable joints 38. According to a preferred embodiment of the present invention, spar 16 can be fabricated from a composite material, though this need not be the case. Other materials can be used to make spar 16 rigid, including titanium, aluminum, plastic, and other materials. According to still a further exemplary embodiment of the present invention, spar 16 can also be made inflatable (i.e., a prism inflatable structure or substantially uniform polyhedron structure).

Figure 5A:
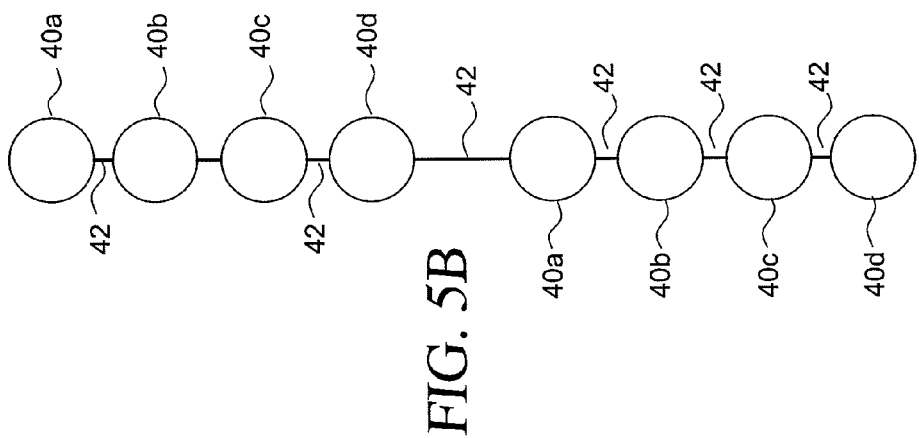
FIGS. 5A and 5B illustrate cross-sectional views of the inflatable rib shown in FIG. 4.
Figure 5B:
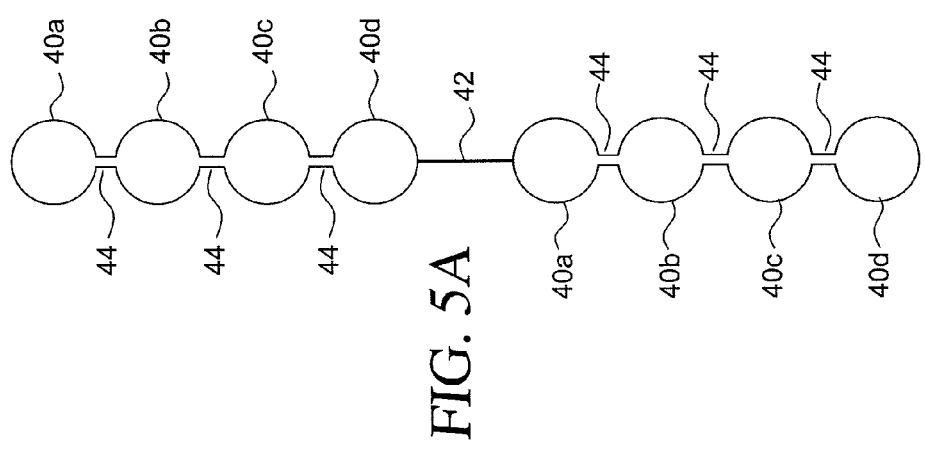

According to a preferred embodiment of the present invention, there is a rib 26 at each hinge point in left wing foldable segment 12. As discussed briefly above, one or more ribs 26 can be located within each left wing foldable segment 12 between hinge points. According to a first preferred embodiment of the present invention, a first configuration of rib 26 comprises a plurality of linked, circular cross section tubes 40. According to a preferred embodiment of the present invention, use of linked, circular cross-section tubes 40 allows rib 26 to be made in any airfoil shape required. FIG. 4 illustrates a side view of rib 26 according to an embodiment of the present invention. Rib 26 is made up of a plurality of tubes, 40a-40d, that are substantially circular (though they need not be, as one of ordinary skill in the art of the present invention can appreciate), and are interconnected, at one or more locations, by tube link 44. In the embodiment shown in FIGS. 4, 5A, and 5B, there is only one tube link 44, so that the drawing is not cluttered; according to an exemplary embodiment of the present invention, there can be several tube links 44 so that the gas that is input to tubes 40 of rib 26 can more easily flow to the other tubes 40. Between each tube 40, there is tube connecting area 42 (e.g., 42a, 42b, 42c, 42d), which is a flat piece of material to connect tubes 40 together, and to help provide a definite shape to rib 26. A rib 26 that is formed in this manner may be created from a mold wherein, for example, molten plastic under high pressure is forced into a die creating the inflatable structure. Alternatively, the rib may be created by appropriately sewing plastic impregnated cloth sheets. Such means for manufacturing inflatable devices are well known, and shall not be discussed further, for purposes of brevity and clarity. As shown in FIG. 5B (which corresponds to a view of rib 26 at line 5B-5B, of FIG. 4), there are no tube links 44, because at that location, and others similarly situated, only tube connecting area 44 exists between tubes 40.

Figure 6:
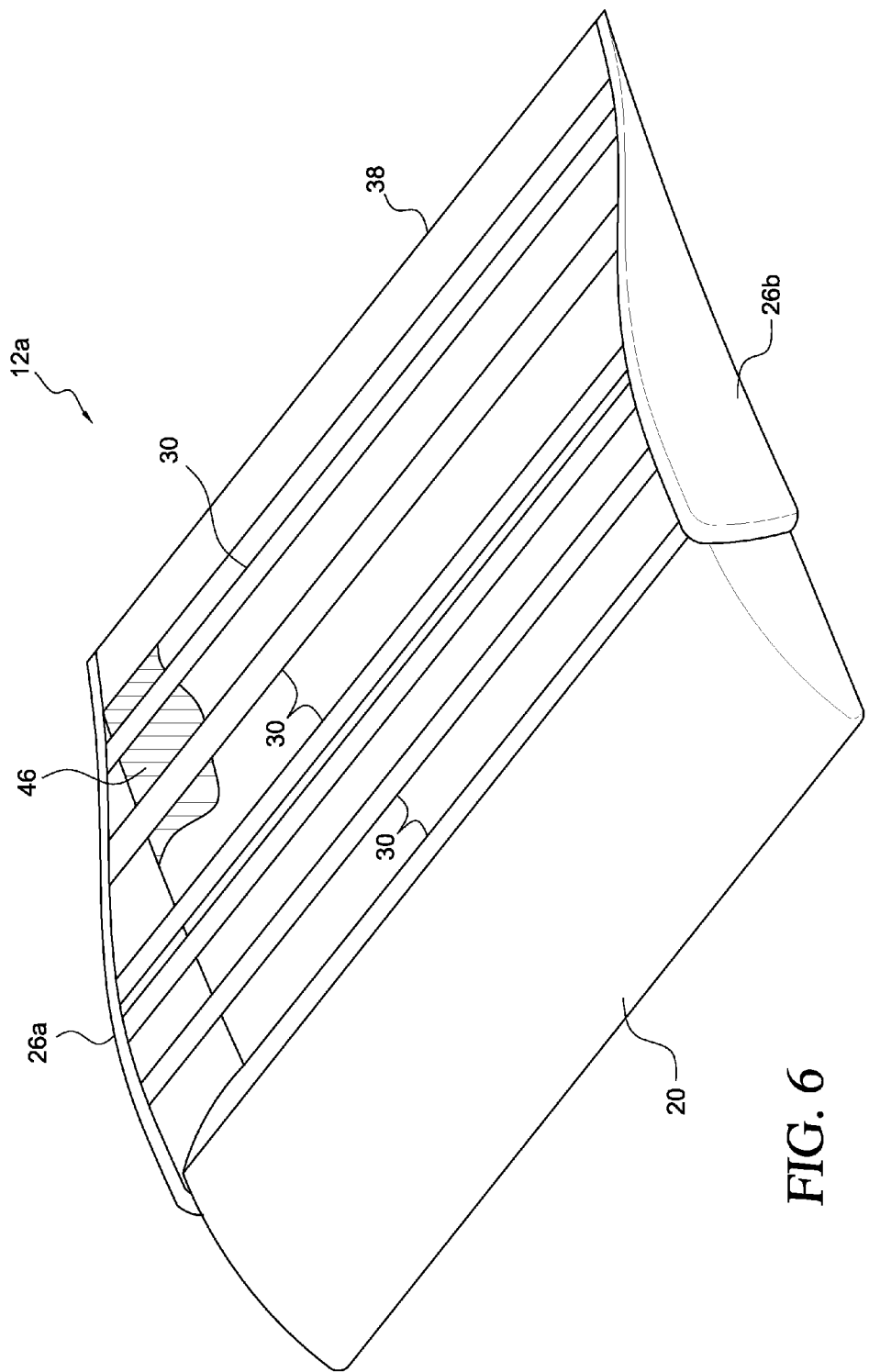
FIG. 6 illustrates a perspective view of a foldable wing and an inflatable rib according to an alternate embodiment of the present invention.

According to another exemplary embodiment of the present invention, rib 26 can be manufactured from one circular cross section tube, as shown in FIG. 6, where the tube is specifically woven to have the proper airfoil shape in the side view, both for thickness and camber. For example, rib 26 can be made of a material, such as Vectran fiber, that can be braided around a rigid mandrel of the proper shape, and consist of fiber orientations to maintain that shape when inflated.

According to an exemplary embodiment of the present invention, as shown in FIGS. 3 and 6, in between ribs 26, there are a series of spanwise stringers 30, and trailing edge member 38. Both spanwise stringer 30 and trailing edge member 38 can be made from inflatable tubes, or they could be rigid parts, such as composite molded boxes, or T sections. According to an exemplary embodiment of the present invention, the inflatable version can be folded smaller, but the rigid version can give better control of the airfoil shape.

The number and location of stringers 30 is selected to give good control of the airfoil shape of the deployed wing. The wing aft of spar 16 is covered with flexible membrane skin 46, similar to the cloth that covered aircraft wings. According to a preferred embodiment of the present invention, the pressure in the inflated ribs provides the force to tension the flexible membrane skin 46, as shown in FIG. 6.

According to a preferred embodiment of the present invention, ribs 26 are inflated with high pressure gas 32, as shown in FIG. 3, as are stringers 30. Low pressure gas 34 is input to spars 16, which is then used to inflate folding leading edge 20, as discussed in greater detail below. Both high pressure gas 32 and low pressure gas 34 can come from a pressure tank (not shown), from a chemical reaction gas generator (also not shown), or from the exhaust of the propulsion engine.

III. Drooping Semi-Rigid Leading Edge

Figure 7:
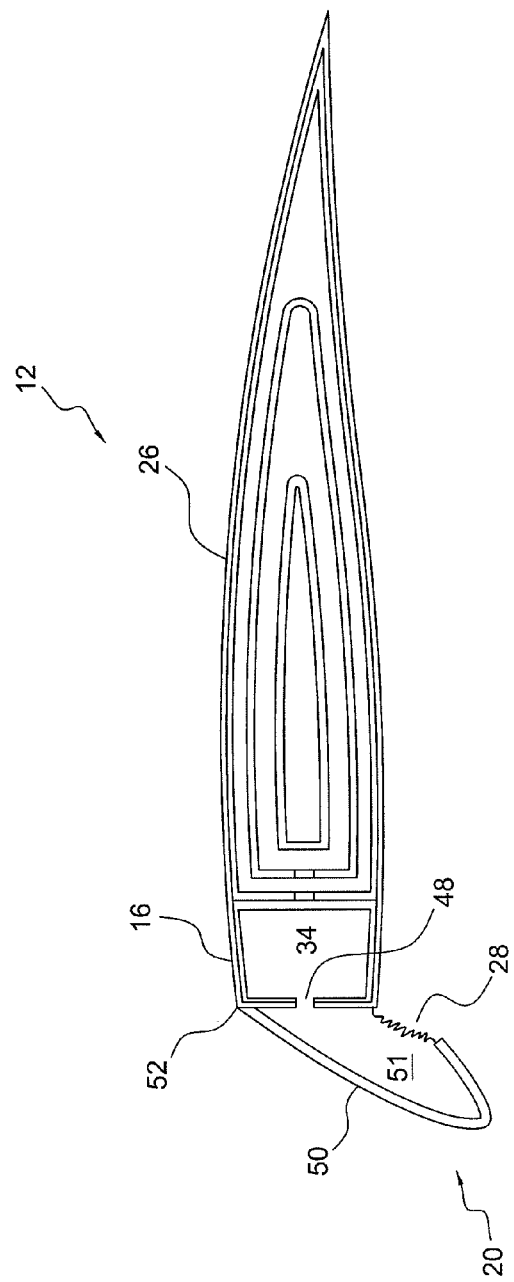
FIG. 7 illustrates a cross-sectional side view of a foldable wing and drooping leading edge structure according to according to an embodiment of the present invention.
Figure 8:
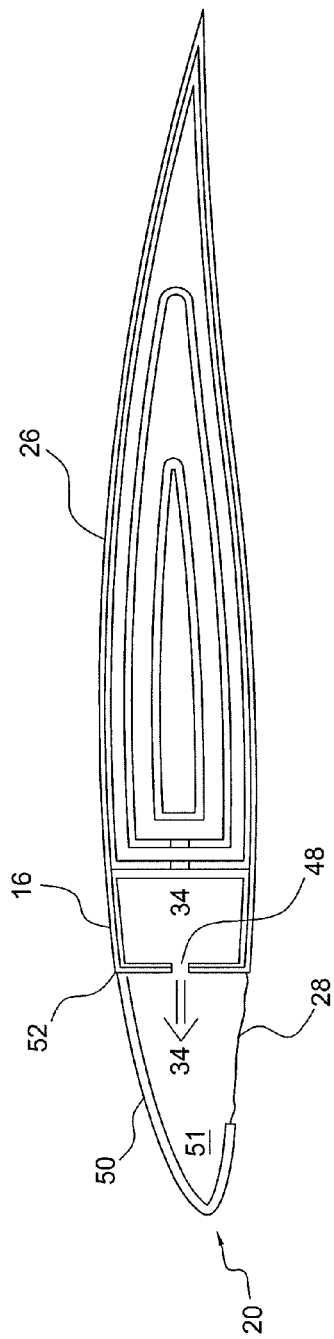
FIG. 8 illustrates another cross-sectional view of the inflatable wing shown in FIG. 7 following inflation of the drooping leading edge structure according to an embodiment of the present invention.

FIGS. 7 and 8 illustrate operation of foldable leading edge 20 according to an embodiment of the present invention. While the previously described folding system allows a large wing to be folded into a small volume, in some cases, even greater compaction is needed. In this case, the wing leading edge could be made to fold also. The aerodynamically critical foldable leading edge 20 comprises two components: folding leading edge shell 50 and leading edge flexible membrane 28. Folding leading edge shell 50 can be made of an appropriately molded composite shell part. Alternatively, leading edge shell 50 can be made from known metals or alloys. Leading edge shell 50 continues around the leading edge onto the front lower surface of foldable wing structure 8. However, leading edge shell 50 of foldable leading edge 20 stops well in front of the lower front face of spar 16, and the gap is bridged by leading edge flexible membrane 28. Leading edge shell 50 is attached to the upper front corner of spar 16 with hinge 52 that allows leading edge shell 50 to fold downwards. Leading edge flexible membrane 28 is large enough that leading edge shell 50 can fold entirely under spar 16, greatly decreasing the volume of foldable wing structure 8.

Referring to FIGS. 3 and 7, low pressure gas 34 is received into spar 16 from fuselage 10. A plurality of spar air holes 48 exhaust low pressure gas 34 into folding leading edge 20. As shown in FIG. 7, leading edge shell 50 hangs downward, relative to wing foldable segment 12, from hinge 52. Hinge 52, as those of ordinary skill in the art of the present invention can appreciate, can be a true hinge (i.e., interlocking cylindrical members with a center pin), or can be a simple piece of flexible material acting as a hinge. As low pressure gas fills spar 16, it begins to exit spar 16 via spar air holes 48 into an interior section or chamber 51 of leading edge shell 50. Chamber 51 is created by the interior portion of leading edge shell 50, and membrane 28. Low pressure gas 34 fills chamber 51, and causes membrane 28 to pull taut, as shown in FIG. 8. Once chamber 51 is completely filled, leading edge segment 20 is fully formed and joined with the balance of wing foldable wing segment 8 to form an effective airfoil. As an alternative method, higher pressure gas may be used to inflate some number of bladders or air bags within the leading edge to provide the deployment force.

According to an alternate exemplary embodiment of the present invention, leading edge segment 20 can be maneuvered into position via small motors, that can be located at or adjacent to hinges 52. In this latter case, low pressure gas 34 can be eliminated as means for positioning leading edge segment 20, or can be used as a back-up means for positioning leading edge segment 20.

IV. Spiral Fold Spar

According to an exemplary embodiment of the present invention, foldable wing structure 8 can be folded in a spiral configuration, as shown and described in reference to FIGS. 9-13, and 15. According to a preferred embodiment of the present invention, several features are preferably present in order to spirally fold foldable wing structure 8: foldable wing structure 8 preferably has at least three wing foldable segments 12, preferably four: e.g., 12a, 12b, 12c, 12d; each foldable wing segment 12 preferably contains a spar 16 to carry the major loads; substantially the entire airfoil aft of spars 16 comprises a combination of collapsible, inflatable, and flexible elements, such that substantially the entire airfoil aft of spar 16 can be substantially collapsed and stowed in the aft part of spar 16 of each foldable wing segment 12; and at the junction of spars 16, there is hinge 54 (e.g., 54a, 54b, 54c, 54d) with an axis of rotation that is approximately, but not exactly, perpendicular to the plane of foldable wing structure 8.

Figure 15A:
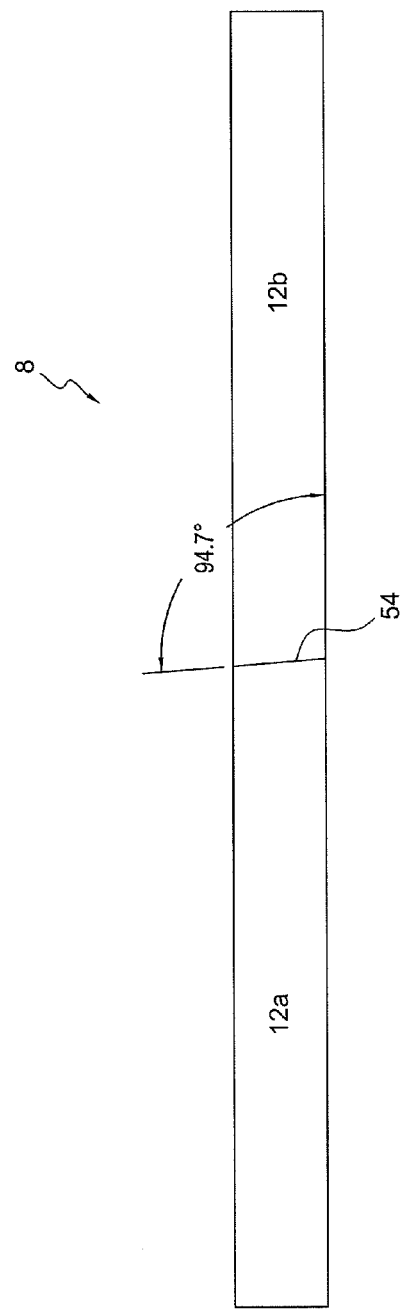
Figure 15B:
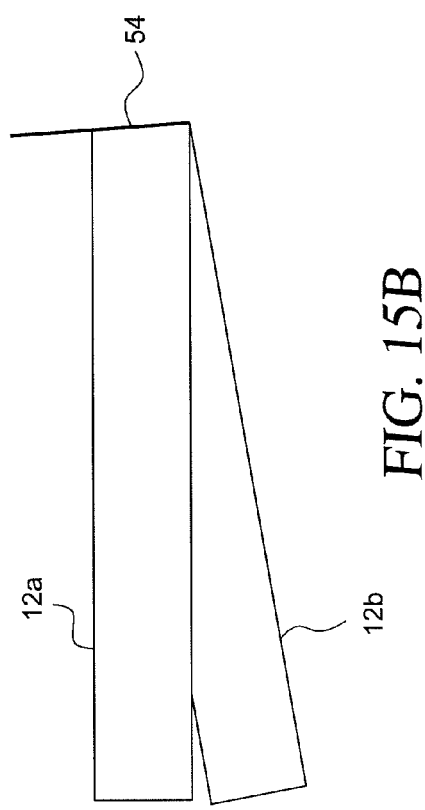
Figure 15D:
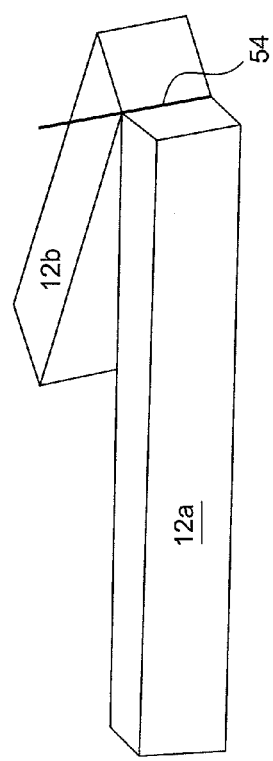
Figure 15E:
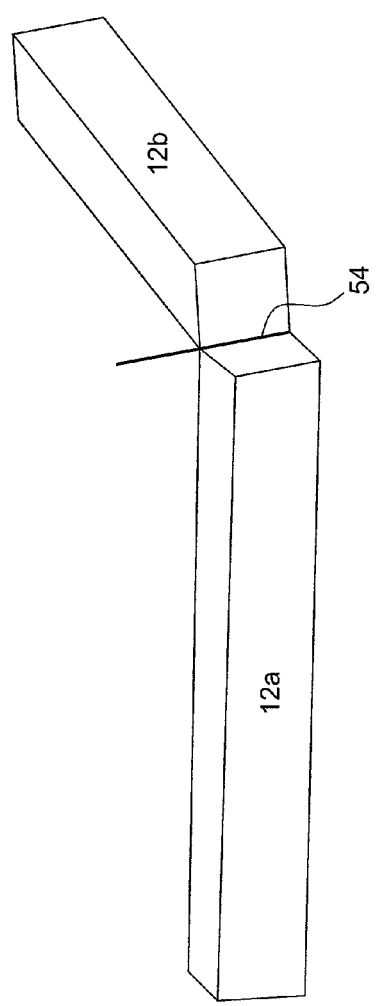
Figure 15G:
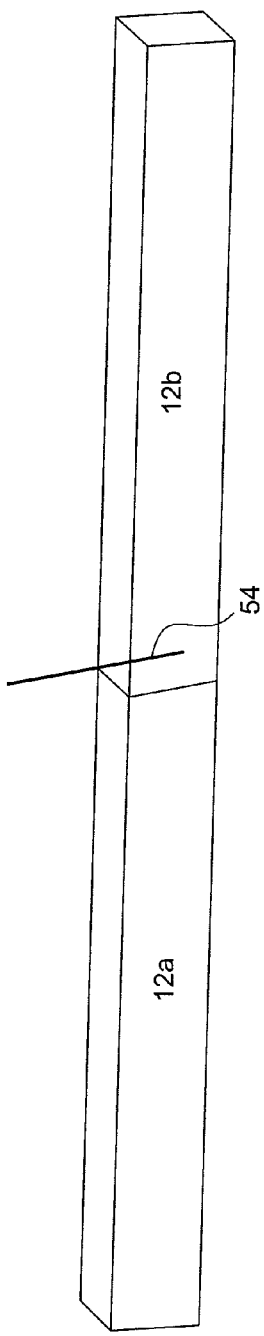

FIGS. 14A-C illustrate a hypothetical wing structure in which a hinge is provided that is substantially perpendicular to the plane of the wing. The purpose of FIGS. 14A-C is to illustrate why spiral wing hinge 54 needs to be at an angle other than substantially perpendicular to the plane of foldable wing structure 8. As shown in FIG. 14A, the hypothetical wing comprises two segments, A and B; each are joined together by hinge g, which is substantially perpendicular to plane P of the hypothetical wing. FIG. 14B illustrates what happens when segments A and B are folded together: they are nearly perfectly aligned—point d of segment B is adjacent to point c of segment A. FIG. 14C illustrates the substantially perpendicularity of hinge g. In contrast, according to a preferred embodiment of the present invention, spiral foldable wing structure 12 comprises spiral wing hinge 54 that is offset from perpendicular as shown in FIG. 15. In FIGS. 15A-15G, simplified diagrams of foldable wing segments 12a and 12b are shown to illustrate the embodiments of the present invention. In FIG. 15A, foldable wing segment 12a is rotationally hingedly connected via hinge 54 to foldable wing segment 12b. The angle of offset θ is shown to be about 4.7° (i.e., an angle of offset from perpendicular). The angle of offset θ can be between 1 and 5° according to a preferred embodiment of the present invention. In FIG. 15B, foldable wing segment 12b has been rotated about hinge 54; because the angle of offset θ was set to 94.7° in the direction shown, foldable wing segment 12b folded under foldable wing segment 12a. FIG. 15C is a perspective view of foldable wing segments 12a and 12b, and FIGS. 15D-15G illustrate the spatial relationship between foldable wing segments 12a and 12b as foldable wing segment 12b is rotated through about 180° with respect to foldable wing segment 12a.

If spiral wing hinge 54 includes an angle of offset θ, then the end portion of foldable wing segment 12a, when folded back at about 180°, will lie partially on top of, or below, the end portion of foldable wing segment 12a (as shown and described in FIGS. 9-13). According to a preferred embodiment of the present invention, angle of offset θ is between about 1° and about 4°.

Because spiral wing hinge 54 is attached to spar 16 with an angle of offset θ, the hinge line is canted slightly in a front (or rear) view, such that spars 16 of respective inboard and outboard foldable wing segments 12a-d are not parallel to each other, but instead, according to a preferred embodiment of the present invention, the end of the outboard foldable wing segment 12d is displaced upwards or downwards compared to the end of the inboard foldable wing segment 12a by approximately the thickness of spar 16. The angle of offset θ is chosen so that the end of the next segment 12 can lie entirely above the previous one; that is, spiral wing hinge 54a is offset so that the tip of wing foldable segment 12d lies above the root of wing foldable segment 12c when folded, thus allowing wing foldable segment 12c to be entirely above wing foldable segment 12b, and so on.

According to an exemplary embodiment of the present invention, use of angle of offset θ with spiral wing hinge 54 allows the additional foldable wing segments 12b-d to be folded such that a third foldable wings segment 12c from the wing root will lie entirely above first foldable wing segment 12a from the wing root. If there is a fourth foldable wing segment 12d, it will lie above second foldable wing segment 12b.

According to a preferred embodiment of the present invention, a deployment method is provided that substantially minimizes the peak deployment load for deploying foldable wing structure 8. According to the method of deployment, the first step comprises unfolding spiral wing hinge 54d (shown in FIG. 13) located between the side of fuselage 10 and first foldable wing segment 12a. Spiral wing hinge 54d joins foldable wing structure 8 to short wing segment 12x (which is not foldable, but considered a wing segment for purposes of our discussion), at first foldable wing segment 12a. Arrow A indicates how foldable wing structure 8 is attached to wing structure 12x and fuselage 10. Once first foldable wing segment 12a is deployed, as shown in FIG. 13 (note that when first foldable wing segment 12a is deployed away from fuselage 10, foldable wing segments 12b-d are still folded and undeployed, resting upon first foldable wing segment 12a), then spiral wing hinge 54c is deployed, wherein spiral wing hinge 54c (shown in FIG. 13), located between first foldable wing segment 12a and second foldable wing segment 12b is rotated, thereby deploying second foldable wing segment 12b, resulting in foldable wing structure 8 as shown in FIG. 12.

Figure 10:
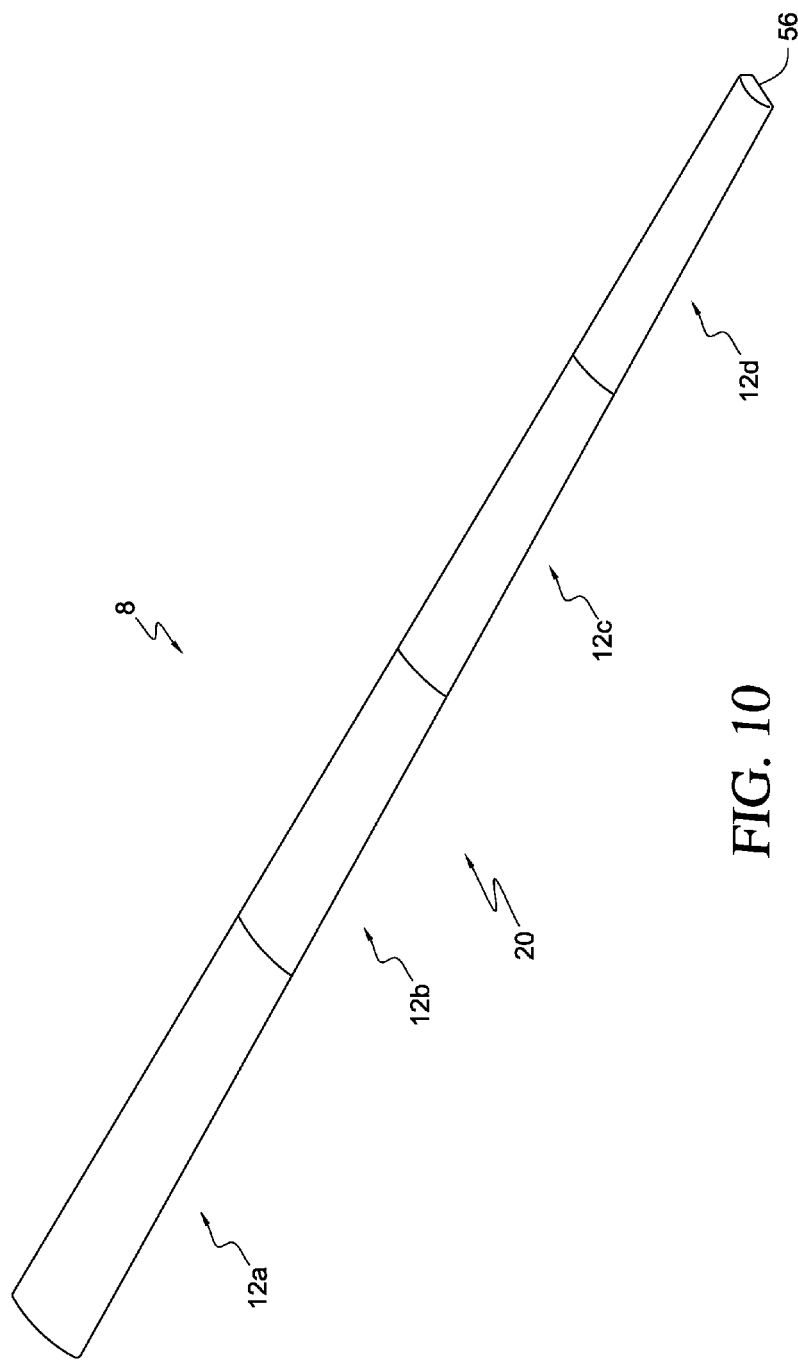
Figure 11:
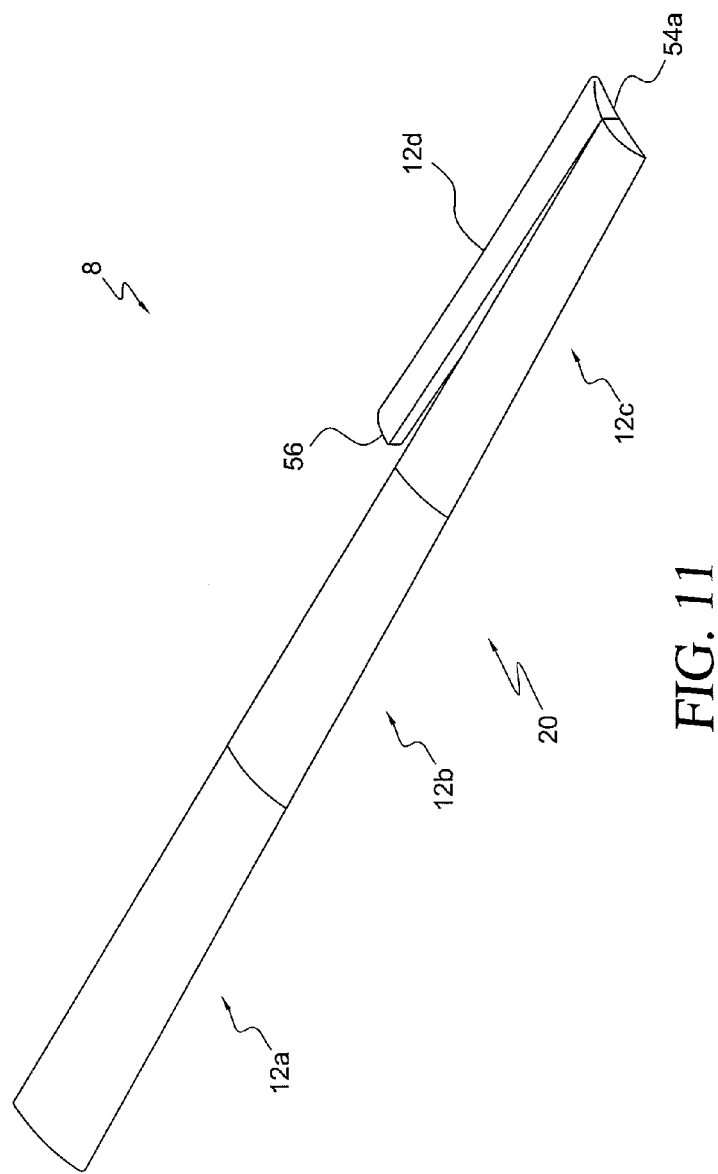
Figure 12:
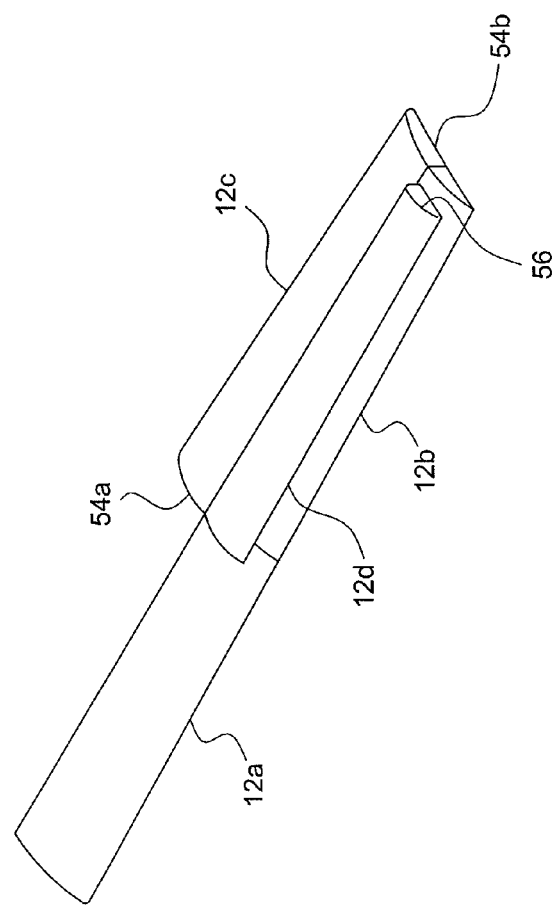
Figure 13:
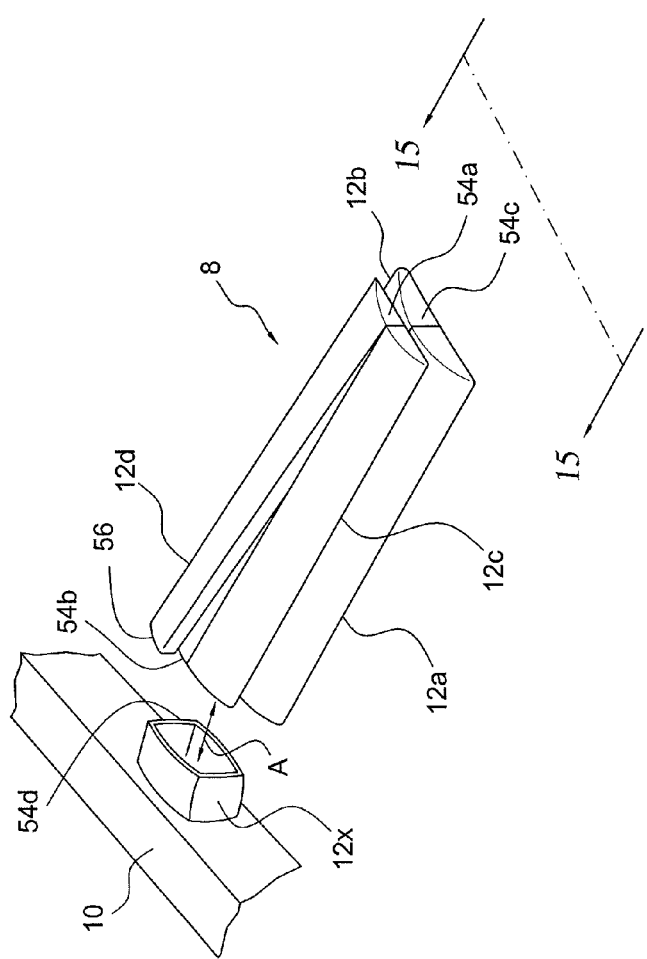

Following deployment of second foldable wing segment 12b about spiral wing hinge 54c, third foldable wing segment 12c can be deployed by rotating it about spiral wing hinge 54b, as shown in FIG. 12. According to an exemplary embodiment of the present invention, each foldable wing segment 12 rotates clockwise when viewed from above and facing fore of the aircraft. After third foldable wing segment 12c rotates about spiral wing hinge 54b, a foldable wing structure 8 appears as shown in FIG. 11. The final rotation of foldable wing segment 12d then occurs about spiral wing hinge 54a (shown in FIG. 11), resulting in the foldable wing structure 8 as shown in FIG. 10. Note in FIGS. 10-13, the location of wingtip 56; if a plot were to be made of the position of wingtip 56 in regard to a plane of foldable wing structure 8, the plot of the position of wingtip 56 would rotate and spiral inward and upward in regard to the root of foldable wing structure 8.

Figure 9:
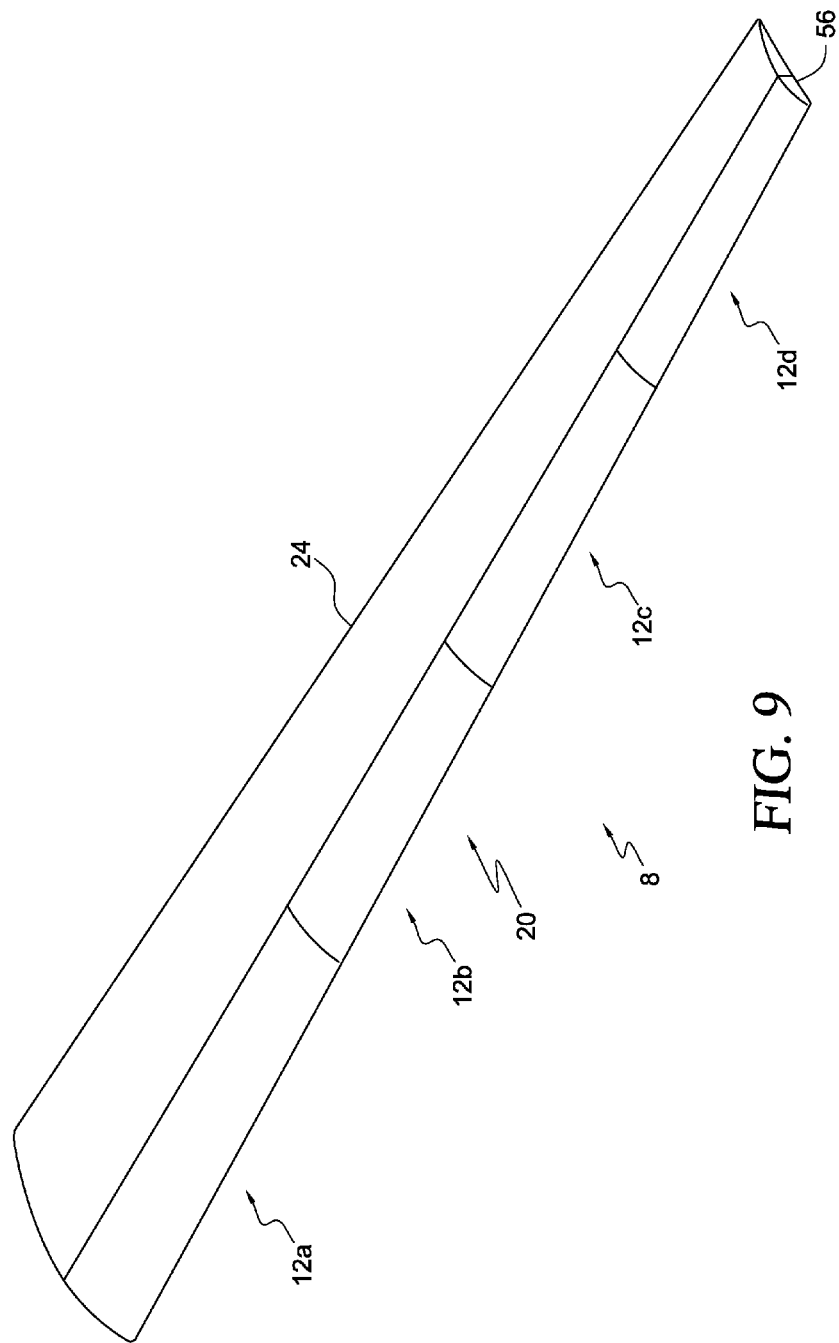
FIGS. 9-13 illustrate a sequence of perspective views of a foldable wing structure, as the foldable wing structure folds to a storage position, and wherein foldable wing segments are connected by hinges that are canted at a first angle according to an embodiment of the present invention.

Following complete spiral deployment of foldable wing segments 12a-d, the aft trailing edge portion 24 of foldable wing structure 8 is deployed, as shown in FIG. 9. According to an exemplary embodiment of the present invention, deployment of left and right foldable wing structures 8a, 8b can occur simultaneously, or one after the other. According to a preferred embodiment of the present invention, the aforementioned and detailed discussion of method of spiral deployment of foldable wing structure 8 provides a method of foldable wing deployment wherein the longest moment arm during a deployment is the length of one foldable wing segment 12.

V. Pneumatic Deployment of Foldable Wing Structure Via Inflatable Ribs

According to an alternate embodiment of the invention, an alternate system and method for deploying foldable wing structure 8 can be employed. The alternate method for deploying foldable swing structure 9 comprises the use of an inflatable spar extending rib 58, as shown in FIGS. 16 and 17.

Figure 16:
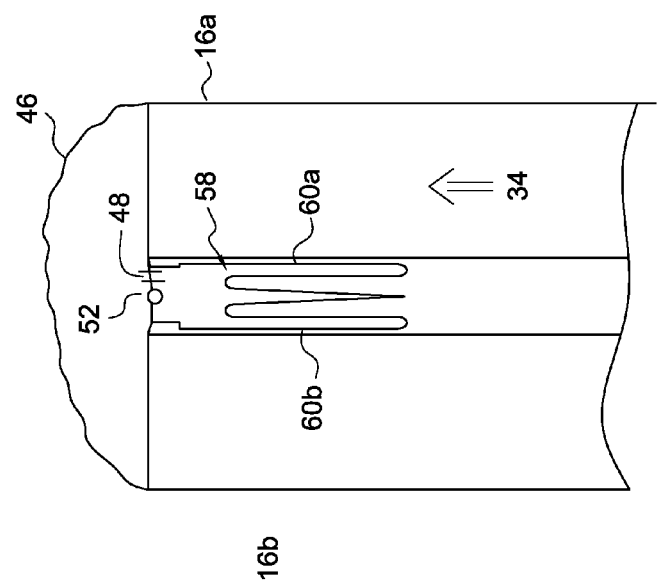
FIGS. 16 and 17 illustrate a foldable rib and spar extending structure according to an embodiment of the present invention.

Referring to FIG. 16, inflatable spar extending rib 58 is shown with spars 16a, 16b in a deflated state. Hinge 52 connects spar 16a and 16b together, and membrane 46 provides a sealed path for low pressure gas 34 to travel. Spar gas hole 48 passes low pressure gas 34 from spars 16a, 16b into inflatable spar extending rib 58. In the deflated state, inflatable spar extending rib 58 folds neatly between spars 16a, 16b. Adjacent to spar 16a is right arm 60a of inflatable spar extending rib 58 and adjacent to spar 16b is left arm 60b of inflatable spar extending rib 58. As low pressure gas begins to fill inflatable spar extending rib 58, both arms 60a, 60b fill with low pressure gas 34 as well, extending in both directions, respectively, thereby pushing on spars 16a, 16b in the direction of each other. The low gas pressure gives a positive deployment moment for the full 180 degrees of hinge 52 travel. According to another alternate embodiment of the present invention, arms 60a, 60b can even be woven as part of spars 16. The gas to inflate the spar tubes and ribs can come from a pressure tank, from a chemical reaction gas generator, or from the exhaust of the propulsion engine.

Figure 17:
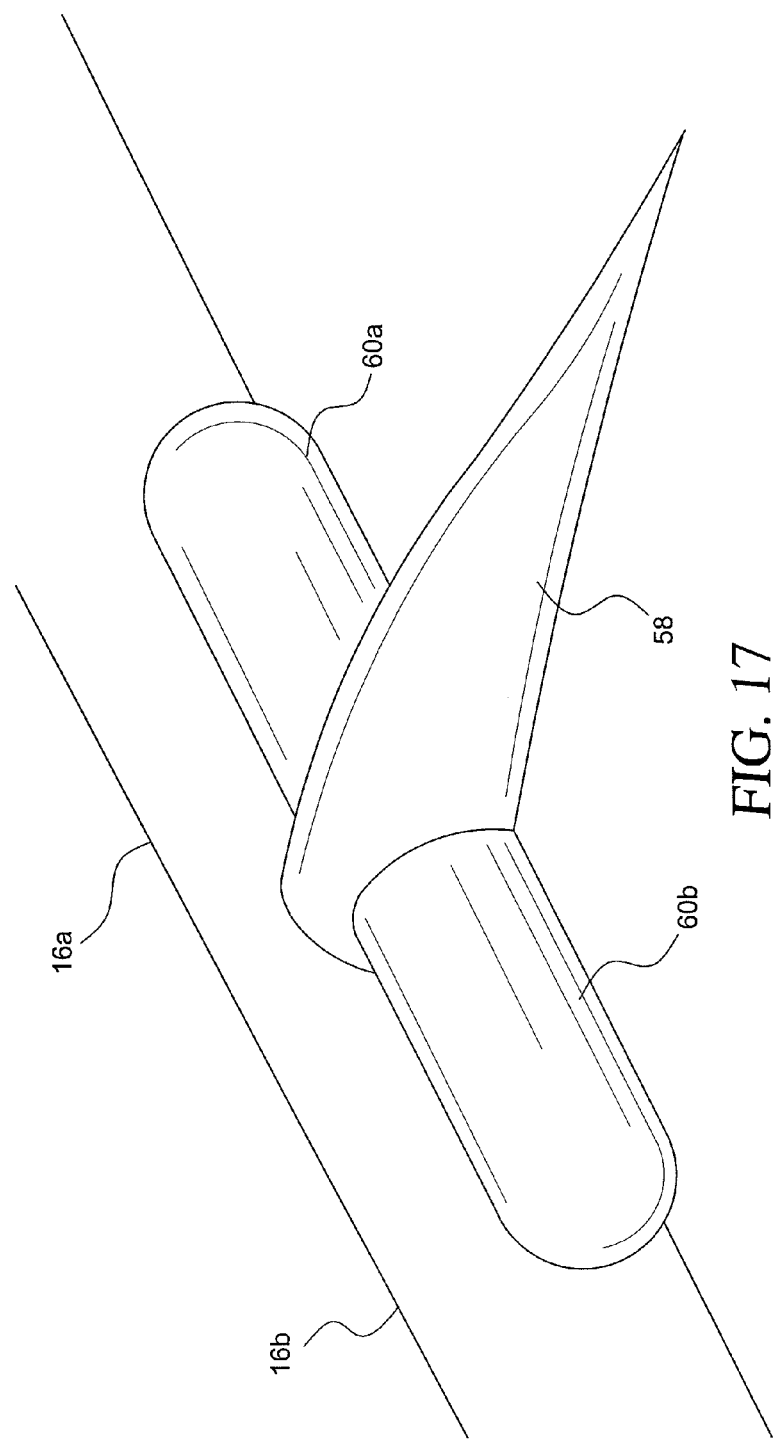

Following complete inflation of inflatable spar extending rib 58, the configuration of spars 16a, 16b and inflatable spar extending rib 58 as shown in FIG. 17. As can be seen, right arm 60a still pushes against and is adjacent to spar 16a, while left arm 60b pushes against and is adjacent to spar 16b. The main body of inflatable spar extending rib 58 extends backwards, aft of spars 16a, 16b to ensure deployment of stringers 30 and trailing edge 38 components, as discussed in detail above.

According to an alternate embodiment of the present invention, hinges 52 in spar 16 can be deployed by any of several exemplary options, such as a motor and gear train at each hinge, or a tensioned wire or cable in the wing leading edge.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A wing segment for a very high altitude aircraft capable of operating at an altitude at or above 85,000 feet, comprising:
    at least two inflatable ribs, each inflatable rib comprising:
        a plurality of inflatable tubes including an innermost tube;
        a plurality of outer connecting surfaces, wherein each outer connecting surface connects one of the plurality of tubes to an adjacent one of the plurality of tubes;
        an innermost connecting surface that connects an inner perimeter of the innermost tube to itself; and
        a linking inflatable tube that is connected to each of the plurality of tubes, and is configured to receive gas and to distribute the received gas to the plurality of tubes, thereby inflating each of the tubes to form the inflatable rib;
    a wing flexible skin disposed between the at least two inflatable ribs;
    a plurality of stringers and a trailing edge, which are configured to maintain the wing segment in a predetermined airfoil shape.

2. The wing segment according to claim 1, wherein at least one of the stringers comprises an inflatable tube.

3. The wing segment according to claim 1, wherein at least one of the stringers comprises a rigid member comprising a metal.

4. The wing segment according to claim 1, wherein the trailing edge comprises a rigid member comprising a metal.

5. The wing segment according to claim 1, wherein each of the stringers comprises (i) one or more rigid materials on an exterior of the wing segment and (ii) an inflatable tube inside the wing segment, and wherein the inflatable tube is configured to provide stiffness with a predetermined stowed volume and to provide a predetermined wing segment shape.

6. The wing segment according to claim 1, wherein the trailing edge comprises an inflatable tube.

7. The wing segment according to claim 1, wherein at least one of the stringers comprises a rigid shape comprising a composite material.

8. The wing segment according to claim 1, wherein the trailing edge comprises a rigid shape comprising a composite material.

* * * * *